March 16, 1965     M. D. GIBBONS     3,174,063
COMPATIBLE ELECTRODE SYSTEM IN VACUUM THERMIONIC APPARATUS
Filed April 27, 1960
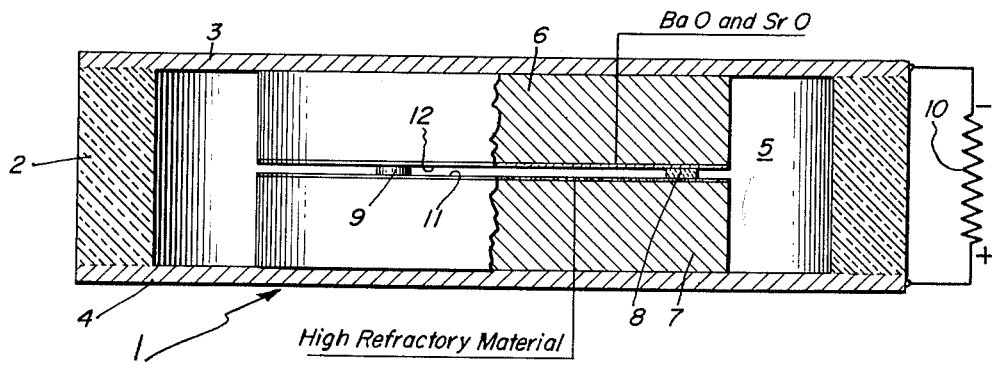
*Inventor:*
*Martin D. Gibbons,*
by *Karl A. Ohralik*
*His Attorney.*

United States Patent Office 3,174,063
Patented Mar. 16, 1965

3,174,063
COMPATIBLE ELECTRODE SYSTEM IN VACUUM THERMIONIC APPARATUS
Martin D. Gibbons, Scotia, N.Y., assignor to General Electric Company, a corporation of New York
Filed Apr. 27, 1960, Ser. No. 25,098
3 Claims. (Cl. 310—4)

This invention relates to a thermionic emitting system having particular application in a thermionic converter for converting heat energy to electrical energy.

In one form of thermionic converter, a cathode electrode surface and a collector electrode surface are closely spaced in an evacuated chamber. Heat energy is supplied to the cathode electrode to raise its temperature to a level of relatively high electron emission. The electrons are emitted with sufficient energy to traverse the region between electrodes and are received and collected by the collector electrode. Use is made of the current arising from collected electrons in a load circuit externally connected between the collector electrode and the cathode.

The output potential of a thermionic converter of this type is substantially equal to the excess of work function of the collector electrode over the work function of the anode, plus a kinetic energy term, 2KT, wherein K is Boltzman constant and T is absolute temperature of the cathode, less certain losses. Accordingly, in order to obtain high output potential of a thermionic converter, it is desirable to have a cathode electrode with as high a work function as practicable, due regard being had for substantial electron emission density greater than the space charge limited emission density, and to have a collector electrode with as low a work function as practicable, due regard again being had for maintaining back emission from a collector electrode as low as possible. Maintaining relative high cathode emission and relatively low collector emission is aided by maintaining these electrodes at relative, respective high and low temperatures.

In addition to the importance of maintaining these properties and characteristics, for desirable operation of a thermionic converter, it is important that the converter have long life, requiring a stable cathode at high operating temperatures and that the cathode and collector electrode be compatible with each other. Conventional cathode coatings such as barium-strontium oxide or barium-strontium-calcium oxide do not meet the mentioned requirements. The evaporation rates of these coatings at high current densities are too high for long life and barium oxide evaporates from barium-strontium oxide at least ten times as fast as does strontium oxide. Also, since barium oxide is the chief evaporant from the cathode, it evaporates and builds up a deposit on the collector to increase its work function beyond optimum values of a barium-strontium compound. Accordingly, a thermionic converter with barium-strontium oxide on both the collector and cathode electrodes would have its cathode electrode life limited by evaporation of barium oxide and this barium oxide would cause the work function of the collector to increase beyond satisfactory levels.

It is accordingly a principal object of my invention to provide an improved cathode in a thermionic converter that is stable at operating temperatures and is compatible with the collector during the life of the converter.

In accordance with my invention a stable and compatible system in a thermionic converter is achieved by the provision of a cathode of base material coated with a high refractory material having a low evaporation rate and a collector electrode spaced from the cathode and coated with a complex alkaline earth oxide containing barium, preferably barium-strontium oxide or barium-strontium-calcium oxide. During operation of the converter, the barium oxide is reduced to barium metal which is evaporated or dispensed and deposited on the cathode to activate the same and increase the emission efficiency thereof. Systems involving cathodes on which barium is dispensed are known. However, in accordance with my invention, the refractory coating material on the cathode is preferably a high refractory, alkaline earth oxide having a low evaporation rate. Examples of such materials are strontium-calcium oxide, strontium oxide and calcium oxide. Of this class of preferred materials, strontium-calcium oxide is preferred to this purpose. However, many other materials too numerous to mention specifically, are satisfactory for this purpose. Typical examples of such other materials are non-alkaline earth oxides such as alumina, thorium oxide, beryllium oxide and hafnium oxide, non-oxides such as zirconium carbide (ZrC), barium-calcium tungstate ($Ba_2 Ca WO_6$), strontium calcium tungstate ($Sr_2 Ca WO_6$), or even high refractory metals of low evaporation rates. The emission efficiency of these coatings is usually relatively low and the barium dispensed thereon from the collector provides high emission rates from the cathode, it being only necessary that by reason of the high refractory and low evaporation rate properties, the cathode coating provides a good base for the barium activator.

The novel features believed characteristic of the present invention are set forth in the appended claims. The invention itself together with further objects and advantages thereof may be understood with reference to the accompanying drawing in which the single figure illustrates in cross-sectional view a typical apparatus with which the present invention may be practiced.

Referring now to the drawing for a more detailed description of the invention, 1 represents generally a thermionic converter device incorporating features of the present invention and including a hollow, cylindrical, ceramic member 2 in sealed abutment at its respective ends with conductive metal plates 3 and 4. The members 2, 3 and 4 form an enclosed region 5 within the interior of the enclosure which is evacuated. In conductive contact with the plate 3 and supported thereby, is a conductive metal collector 6 and in conductive contact with the plate 4 and supported thereby is a conductive cathode member 7. The electrodes 6 and 7 are closely spaced with respect to each other and are maintained at such spacing by a plurality, preferably three, of insulating spacers or shims, two of which are shown at 8 and 9. These spacers or shims may be of material such as sapphire or other suitable insulating, refractory material. Suitable materials from which electrodes 6 and 7 may be made are molybdenum and tungsten, respectively, or other refractory base metals, and the spacing between these electrodes may be of the order of a one-thousandth of an inch or less. For utilizing the output of the thermionic converter 1, a load element represented by a resistor 10 is connected across the electrodes and a current is passed therethrough in response to the application of heat, represented by the arrows in the drawing, to the plate 6 and the cathode 7.

In accordance with a feature of my invention, for providing a base for an electron emission enhancing material, the cathode 7 is coated with a suitable, high refractory material 11 of low evaporation rate. Materials suitable as such a base include strontium-calcium oxide, calcium oxide, alumina, thorium oxide, beryllium oxide and others. As such a coating, strontium oxide, for example, at approximately 1100° C. has an evaporation rate of the order of $10^{-10}$ grams per centimeter squared per second. In general, materials having an evaporation rate of this order of magnitude or less are found to be satisfactory for the present purposes. However, since different materials adversely affect the collector of the thermionic converter to different extents, certain materials may have somewhat higher evaporation rates and be used entirely satisfactorily in accordance with my invention.

The oxides named are very stable at the temperatures at which the thermionic converter is operated and provide a very desirable surface for the cathode electrode 7. However, these oxides have an emission efficiency too low for satisfactory thermionic converter performance. The emission efficiency of the cathode 7 may be vastly increased by the addition of a small amount of emission enhancing material such as one or more alkaline earth materials or one or more alkali metals, with barium being preferred. In obtaining barium on the cathode 7, the anode electrode is coated at 12 with a layer of complex alkaline earth oxide, preferably barium-strontium oxide and during operation of the converter 1, barium oxide is reduced and the barium metal is evaporated from the collector electrode and is deposited on the cathode. The barium-strontium oxide is utilized since the collector coated with such material has a desirably low work function. The barium evaporated from the anode and deposited on the cathode activates the cathode. Although barium is evaporated from the cathode electrode, it is replenished by the mentioned evaporation of barium from the collector electrode. During the operation of the thermionic converter, a balance between the barium on the cathode and barium on the collector exists for long periods. The inherently stable refractory oxides on the cathode accordingly provide for long life of the thermionic converter.

Although as described herein, the barium which activates the cathode, is derived from that which is evaporated at the anode, it is also within the purview of my invention to provide a separate reservoir or bath of barium which is in communication with the interior of the converter or other device in which the cathode is utilized. The reservoir or bath may be heated so as to evaporate barium which is then deposited on the cathode.

The present invention has been set forth and described as having particular applicability in a thermionic converter device. However, it is to be noted that the cathode of the present invention may be advantageously utilized in electron tubes wherein barium may be dispensed from grids, anodes or wherein vapors rather than barium may be used.

While the present invention has been described by reference to particular embodiments thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. In a thermionic converter, the combination comprising an enclosure including means supporting a pair of electrodes in closely spaced relation and maintaining an evacuated interelectrode space therebetween, one of said electrodes providing a cathode and the other of said electrodes providing a collector, said cathode having a surface of highly refractory material of low evaporation rate at the operating temperature thereof and a coating including barium on said collector and operative at the temperature of operation of the collector to maintain the work function thereof low and to dispense barium to said cathode to enhance the electron emission therefrom.

2. In a thermionic converter, the combination comprising an enclosure including means supporting a pair of electrodes in closely spaced relation and maintaining an evacuated interelectrode space therebetween, one of said electrodes providing a cathode and the other of said electrodes providing a collector, said cathode having a highly refractory alkaline earth oxide coating of low evaporation rate at the operating temperature thereof and a coating including barium on said collector and operative at the temperature of operation of the collector to maintain the work function thereof low and to dispense barium to said cathode to enhance the electron emission therefrom.

3. In a thermionic converter, the combination comprising an enclosure including means supporting a pair of electrodes in closely spaced relation and maintaining an evacuated interelectrode space therebetween, one of said electrodes providing a cathode and the other of said electrodes providing a collector, said cathode having a surface of an alkaline earth oxide coating excluding barium oxide and having a low evaporation rate at the operating temperature thereof and an alkaline earth oxide coating including barium oxide on said collector and operative at the temperature of operation of the collector to maintain the work function thereof low and to dispense barium to said cathode to enhance the electron emission therefrom.

References Cited by the Examiner
UNITED STATES PATENTS

| | | | |
|---|---|---|---|
| 1,701,849 | 2/29 | Holst et al. | 313—310 |
| 2,510,397 | 6/50 | Hansell | 310—4 X |
| 3,021,472 | 2/62 | Hernquist | 310—4 X |

MILTON O. HIRSHFIELD, *Primary Examiner.*